IMAGE

United States Patent
Sato (10) Patent No.: US 11,066,806 B2
(45) Date of Patent: Jul. 20, 2021

(54) ARM FOR WORKING MACHINE, BEARING MEMBER, AND MANUFACTURING METHOD OF THE ARM FOR THE WORKING MACHINE

(71) Applicant: KUBOTA CORPORATION, Osaka (JP)

(72) Inventor: Fuminori Sato, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 16/896,687

(22) Filed: Jun. 9, 2020

(65) Prior Publication Data
US 2020/0299922 A1    Sep. 24, 2020

Related U.S. Application Data

(63) Continuation of application No. PCT/JP2018/040849, filed on Nov. 2, 2018.

(30) Foreign Application Priority Data

Dec. 27, 2017    (JP) ............................. JP2017-250806

(51) Int. Cl.
| | | |
|---|---|---|
| E02F 3/38 | (2006.01) | |
| E02F 3/36 | (2006.01) | |
| F16C 11/06 | (2006.01) | |
| F16C 33/02 | (2006.01) | |

(52) U.S. Cl.
CPC .............. *E02F 3/382* (2013.01); *E02F 3/369* (2013.01); *F16C 11/068* (2013.01); *F16C 33/02* (2013.01)

(58) Field of Classification Search
None
See application file for complete search history.

(56) References Cited

FOREIGN PATENT DOCUMENTS

| JP | 3-13358 U | 2/1991 |
|---|---|---|
| JP | 9-105144 A | 4/1997 |
| JP | 11-280110 A | 10/1999 |
| JP | 2000-336692 A | 12/2000 |

*Primary Examiner* — Ronald P Jarrett
(74) *Attorney, Agent, or Firm* — Birch, Stewart, Kolasch & Birch, LLP.

(57) ABSTRACT

The arm for the working machine includes: an arm body; and the bearing member attached to the arm body. The bearing member includes: a boss; and the greasing tube having: one end portion attached to a greasing hole provided on the boss; the other end portion attached to the arm body; and a tube body portion connecting the one end portion and the other end portion. The side surface of the arm body is provided with a cutout portion to which the tube body portion is inserted, the cutout portion opening toward the tip end portion. The one end portion of the greasing tube and the tube body portion are housed inside the arm body. The other end portion of the greasing tube is oriented to an outside of the arm through the cutout portion and fixed to the side surface of the arm.

7 Claims, 7 Drawing Sheets

ARM FOR WORKING MACHINE, BEARING MEMBER, AND MANUFACTURING METHOD OF THE ARM FOR THE WORKING MACHINE

CROSS-REFERENCE TO RELATED APPLICATIONS

The present application is a continuation application of International Application No. PCT/JP 2018/040849, filed Nov. 2, 2018, which claims priority to Japanese Patent Application No. 2017/250806, filed Dec. 27, 2017. The contents of these applications are incorporated herein by reference in their entirety.

BACKGROUND OF THE INVENTION

Field of the Invention

The present invention relates to an arm for a working machine, a bearing member, and a manufacturing method of the arm for the working machine.

Description of Related Art

Japanese Unexamined Patent Publication No. H11-280110 discloses a hydraulic excavator including an arm having a bearing member at a tip end thereof, and including a greasing tube that is communicates the bearing member and a tube body through hole formed in a side plate of the arm through the inside of the arm.

SUMMARY OF THE INVENTION

An arm for a working machine according to one aspect of the present invention, includes: an arm body having a tubular shape; and a bearing member attached to a tip portion of the arm body and pivotally supporting another member. The bearing member includes: a boss having a cylindrical shape; and a greasing tube having: one end portion attached to a greasing hole provided on an outer peripheral surface of the boss; the other end portion attached to a side surface of the arm body; and a tube body portion connecting the one end portion and the other end portion. The tube body portion is curved orienting the one end portion in a radial direction of the boss and orienting the other end portion in a direction substantially parallel to an axial direction of the boss. The side surface of the arm body is provided with a cutout portion to which the tube body portion is inserted, the cutout portion opening toward the tip end portion. The one end portion of the greasing tube and the tube body portion are housed inside the arm body. The other end portion of the greasing tube is oriented to an outside of the arm through the cutout portion and fixed to the side surface of the arm.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 7:
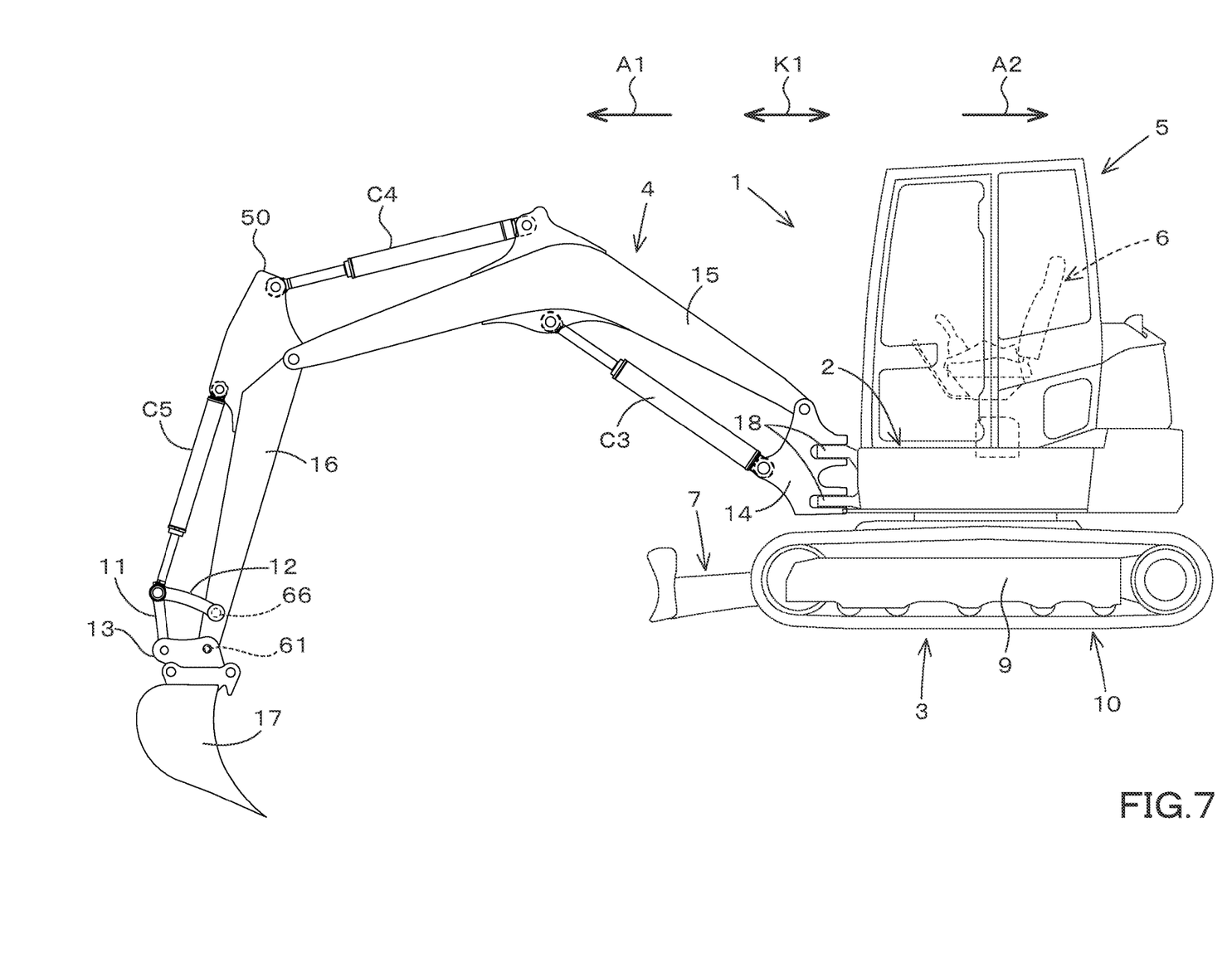
FIG. 7 is a side view of a working machine according to the embodiment.

FIG. 7 is a schematic side view showing the overall configuration of a working machine 1 according to the embodiment. In this embodiment, a backhoe, which is a swiveling working machine, is exemplified as the working machine 1.

As shown in FIG. 7, the working machine 1 includes a machine body (a turn base) 2, a traveling device 3, and a working device 4. A cabin 5 is mounted on the machine body 2. An operator seat (a seat) 6 on which a driver (an operator) sits is provided inside the cabin 5. The operator seat 6 is surrounded by the cabin 5.

In the present embodiment, the front side of the operator sitting on the operator seat 6 of the working machine 1 (a direction indicated by an arrowed line A1 in FIG. 7) is referred to as the front, the rear side of the operator (a direction indicated by an arrowed line A2 in FIG. 7) is referred to as the rear, the left side of the operator (a front surface side of FIG. 7) is referred to as the left, and the right side of the operator (a back surface side of FIG. 7) is referred to as the right.

Figure 4:
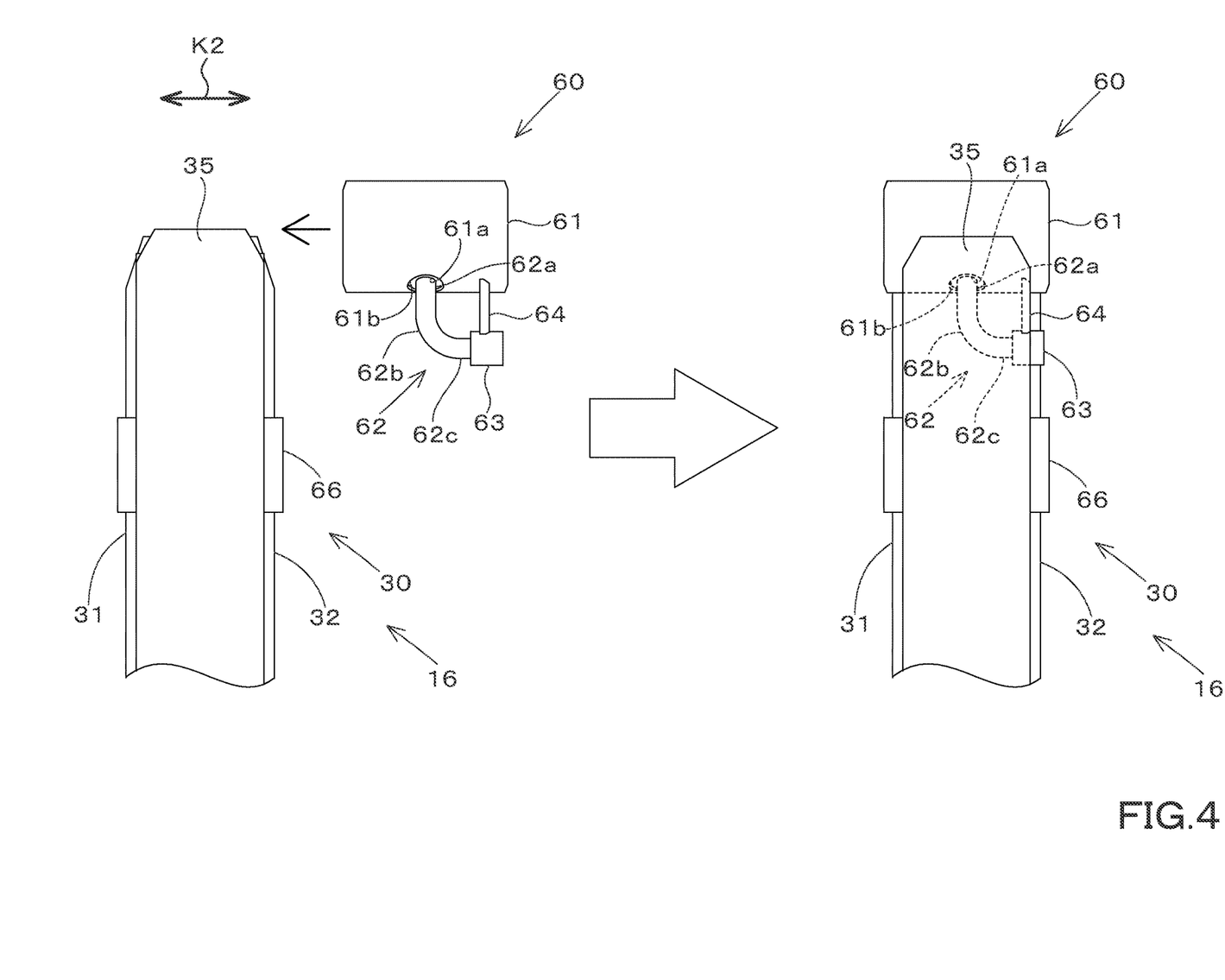
FIG. 4 is a plan view illustrating the passage of the greasing structure to the cutout portion of the arm according to the embodiment.

In addition, the horizontal direction that is orthogonal to a front-rear direction K1 will be described as the machine width direction (a direction indicated by an arrowed line K2 in FIG. 4). The direction from the central portion in the width direction of the machine body 2 to the right portion or the left portion will be described as the machine outward direction. In other words, the machine outward direction is the machine width direction K2 and the direction separating away from the center portion of the machine body 2 in the width direction. The direction opposite to the machine outward direction will be described as the machine inward direction. In other words, the inside of the machine body is the direction of a machine width direction K2, which is a direction approaching the center portion of the machine body 2 in the width direction.

As shown in FIG. 7, the traveling device 3 includes a traveling frame 9 and a traveling mechanism 10. The traveling mechanism 10 is constituted of a crawler-type traveling mechanism 10. In the present embodiment, the traveling device 3 is a crawler-type traveling device 3. The traveling mechanism 10 is provided on the left side of the traveling frame 9, and another traveling mechanism 10 is provided on the right side of the traveling frame 9. A dozer device 7 is attached to the front portion of the traveling device 3. The dozer device 7 is configured to be moved up and down by a hydraulic cylinder.

As shown in FIG. 7, the working device 4 includes a boom 15, an arm 16, and a working tool 17. In the embodiment, a bucket is provided as the working tool 17. The base portion of the boom 15 is pivotally attached to the swing bracket 14 so as to be rotatable (swingable vertically) about a lateral axis (an axis extending in the machine width direction K2). The swing bracket 14 is supported by a support bracket 18 provided on the front portion of the machine body 2 so as to be rotatable about a vertical axis (an axis extending in the vertical direction). The arm 16 is pivotally attached to the tip end side of the boom 15 so as to be rotatable about the lateral axis (so as to swing back and forth or up and down). The working tool 17 is provided on the tip end side of the arm 16 so as to perform the squeezing operation and the dumping operation. More specifically, the working tool 17 is pivotally supported by a first connecting boss 61 provided at the tip end of the arm 16 with an attachment bracket 13 so as to be rotatable around a support shaft. In addition, one end side of the first link 11 is pivotally supported by the working tool 17 with the attachment bracket 13 so as to be rotatable about a support shaft extending in the left-right direction, and one end side of the second link 12 is pivotally supported by the second connecting boss 66 so as to be rotatable around a support shaft extending in the left-right direction, the second connecting boss 66 being provided closer to the base end of the first connecting boss 61 arranged on the tip end side of the arm 16. The other end sides of the first link 11 and the second link 12 are connected to one end portion of a working tool cylinder C5 described later so as to be rotatable about the lateral. The working machine 1 is capable of being equipped with, as the working tool 17, another working tool (a hydraulic attachment) configured to be driven by a hydraulic actuator, instead of or in addition to the bucket. Examples of other working tools include a hydraulic breaker, a hydraulic crusher, an angle broom, an earth auger, a pallet fork, a sweeper, a mower, a snow blower, and the like.

The swing bracket 14 swings in the machine width direction K2 when the hydraulic cylinder is stretched and shortened. The boom 15 swings when the boom cylinder C3 is stretched and shortened. The arm 16 swings when the arm cylinder C4 is stretched and shortened. The working tool 17 performs the squeezing operation and the dumping operation when the bucket cylinder (a working tool cylinder) C5 is stretched and shortened. The boom cylinder C3, the arm cylinder C4, and the bucket cylinder C5 are constituted of the hydraulic cylinders (the hydraulic actuators).

Figure 1:
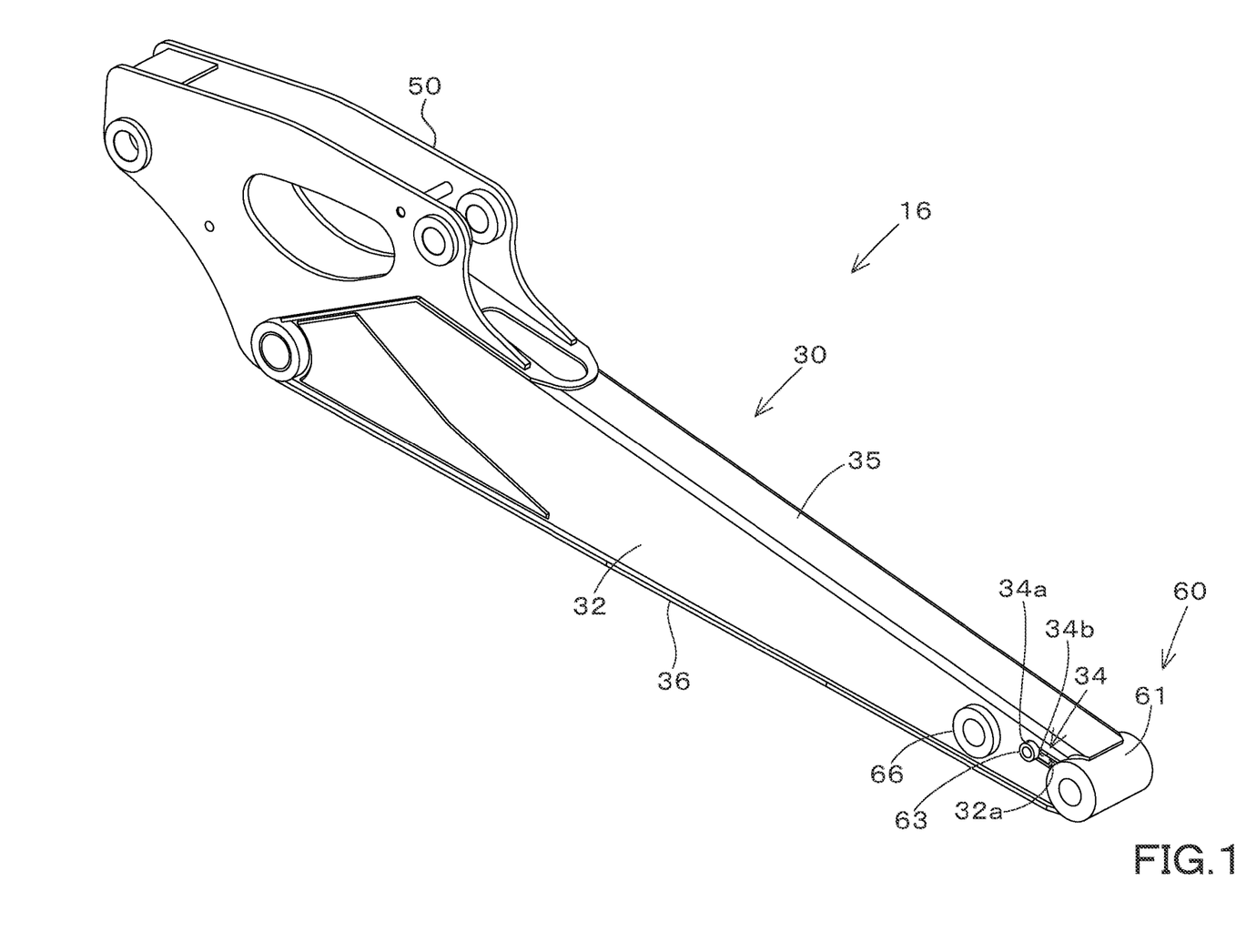
FIG. 1 is a perspective view of a tip end side of an arm according to an embodiment of the present invention.

As shown in FIG. 1, the arm 16 has an arm body 30. The arm body 30 is a long member having a rectangular-tubular shape, and is constituted of a first sidewall 31, a second sidewall 32, a top wall 35, and a bottom wall 36 each made of sheet metals.

Figure 3:
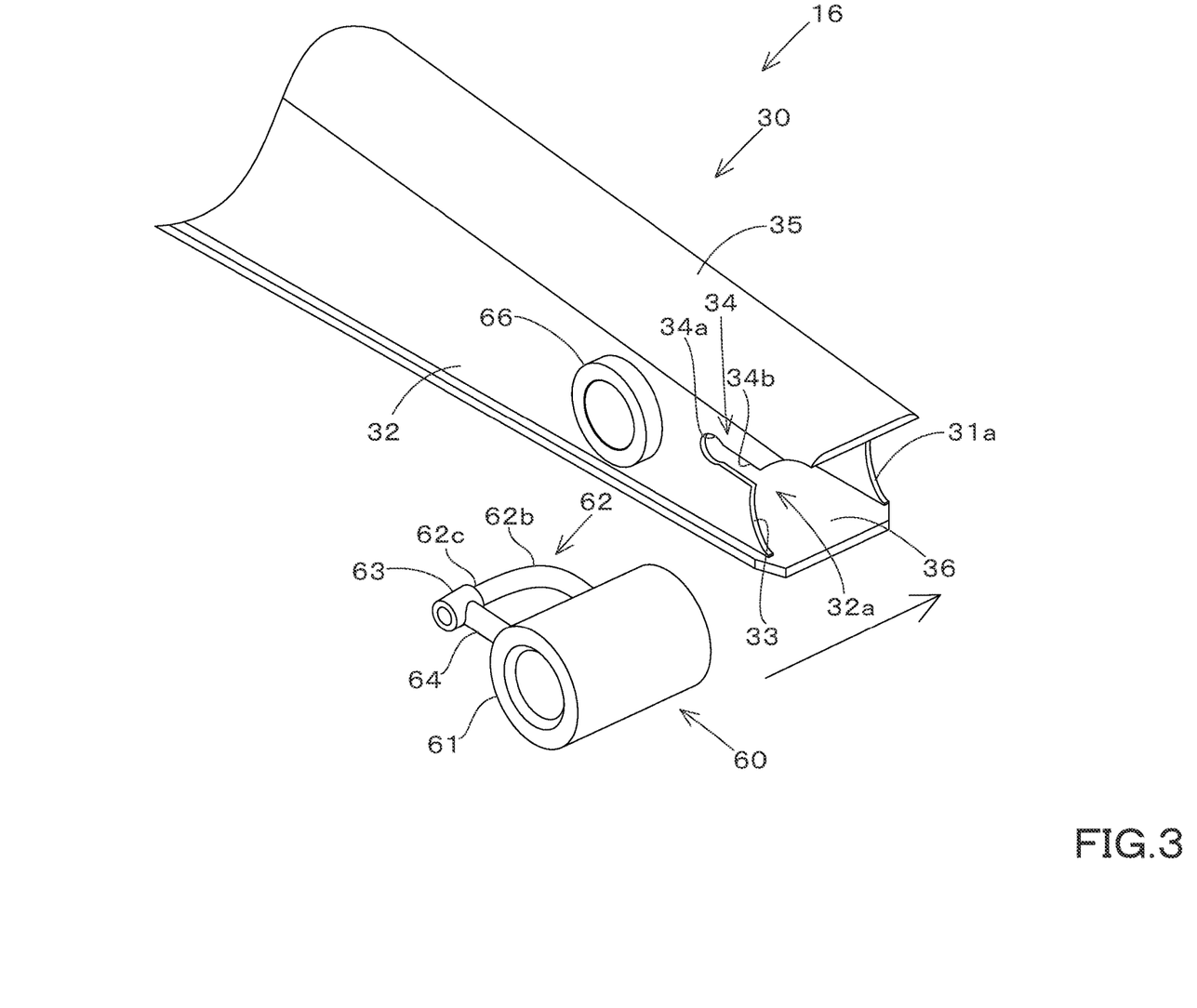
FIG. 3 is a perspective view illustrating passage of a greasing structure to a cutout portion of the arm according to the embodiment.

As shown in FIG. 3, a bearing member 60 is welded to the tip end side of the arm body 30, and a bracket 50 connected to the boom 15 is welded to the base end side of the arm body 30. The bearing member 60 has a first connecting boss (a boss) 61 configured to rotatably support the working tool 17 with the attachment bracket 13.

Figure 2:
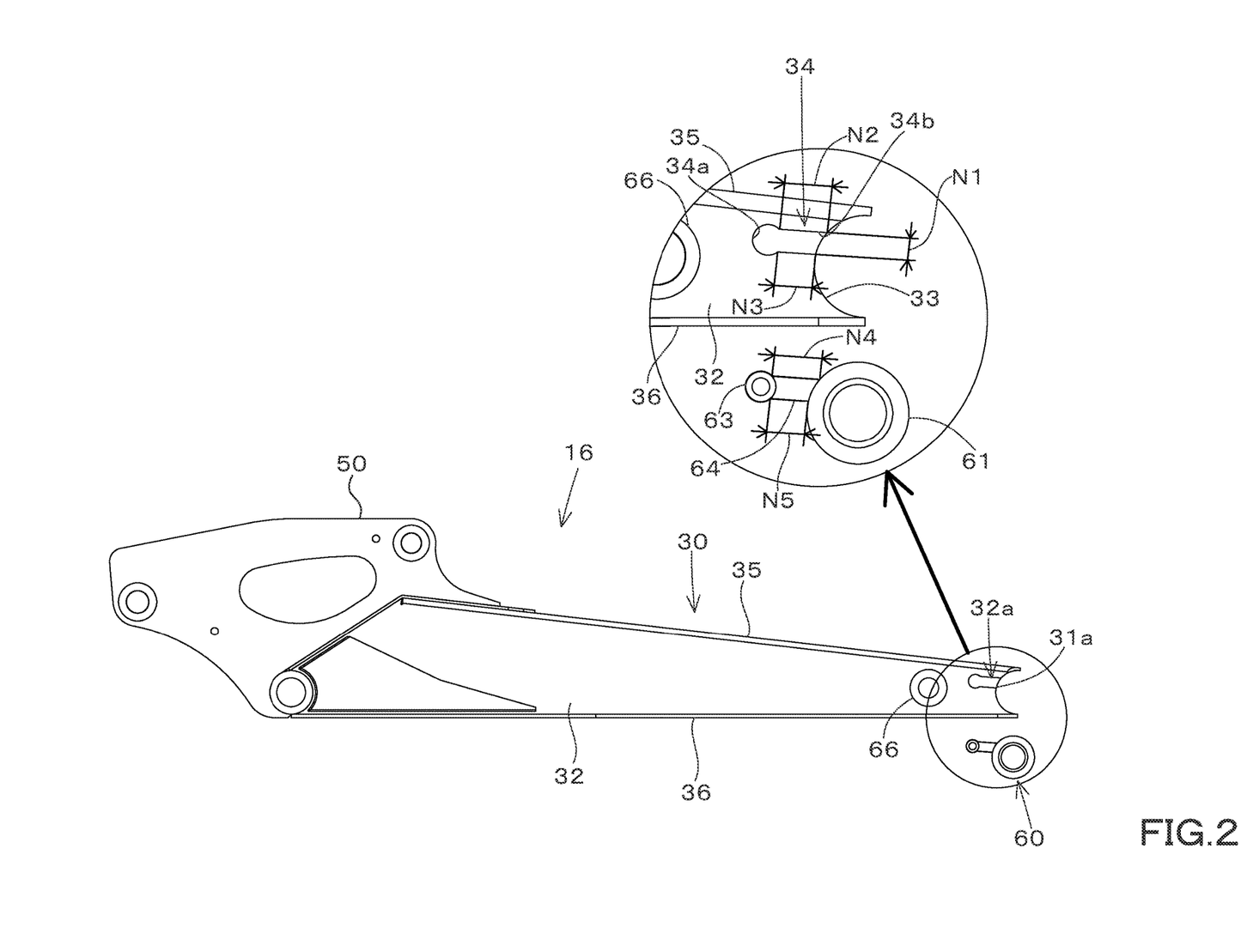
FIG. 2 is a side view of the arm according to the embodiment.

The first sidewall 31 and the second sidewall 32 are plate members that are elongated in the longitudinal direction of the arm 16, and are arranged opposed to each other with a clearance therebetween. As shown in FIG. 2 and FIG. 3, a cutout portion 31a is formed on the tip end side of the first sidewall 31, and a cutout portion 32a is formed on the tip end side of the second sidewall 32. The cutout portion 31a and the cutout portion 32a have a shape corresponding to the outer peripheral shape of the first connecting boss 61, and the cutout portion 31a is welded to the outer peripheral surface of the one end of the first connecting boss 61 in the circumferential direction. The cutout portion 32a is welded to the outer peripheral surface of the other end of the first connecting boss 61 in the circumferential direction. One end side of the first connecting boss 61 protrudes outward from the first sidewall 31, and the other end side protrudes outward from the second sidewall 32. In addition, a greasing portion 63 for greasing the inside of the first connecting boss 61 is provided in the vicinity of the tip end portion of the second sidewall 32. The greasing portion 63 will be described below in detail.

In addition, a second connecting boss 66 penetrating both of the sidewalls is formed in the middle portions of the first sidewall 31 and the second sidewall 32. The second connecting boss 66 is formed to have a cylindrical shape, and pivotally supports one end side of the second link 12 so as to be rotatable about a support shaft in the left-right direction. The top wall 35 is a long plate member that connects the upper portion of the first sidewall 31 and the upper portion of the second sidewall 32. The tip end side of the top wall 35 is welded to the outer peripheral surface of the first connecting boss 61 along the axial direction of the first connecting boss 61. As shown in FIG. 2, the bottom wall 36 is a long plate member that connects the lower portion of the first sidewall 31 and the lower portion of the second sidewall 32. That is, the top wall 35 and the bottom wall 36 are arranged opposed to each other. The tip end side of the bottom wall 36 is welded to the outer peripheral surface of the first connecting boss 61 along the axial direction of the first connecting boss 61.

A greasing structure of the bearing member 60 will be described below in detail. As shown in FIG. 1 and FIG. 3, the arm 16 has the greasing structure configured to supply the grease from the greasing portion 63 provided on the side surface (the second sidewall 32) of the arm body 30 to the inside of the first connecting boss 61.

Figure 5:
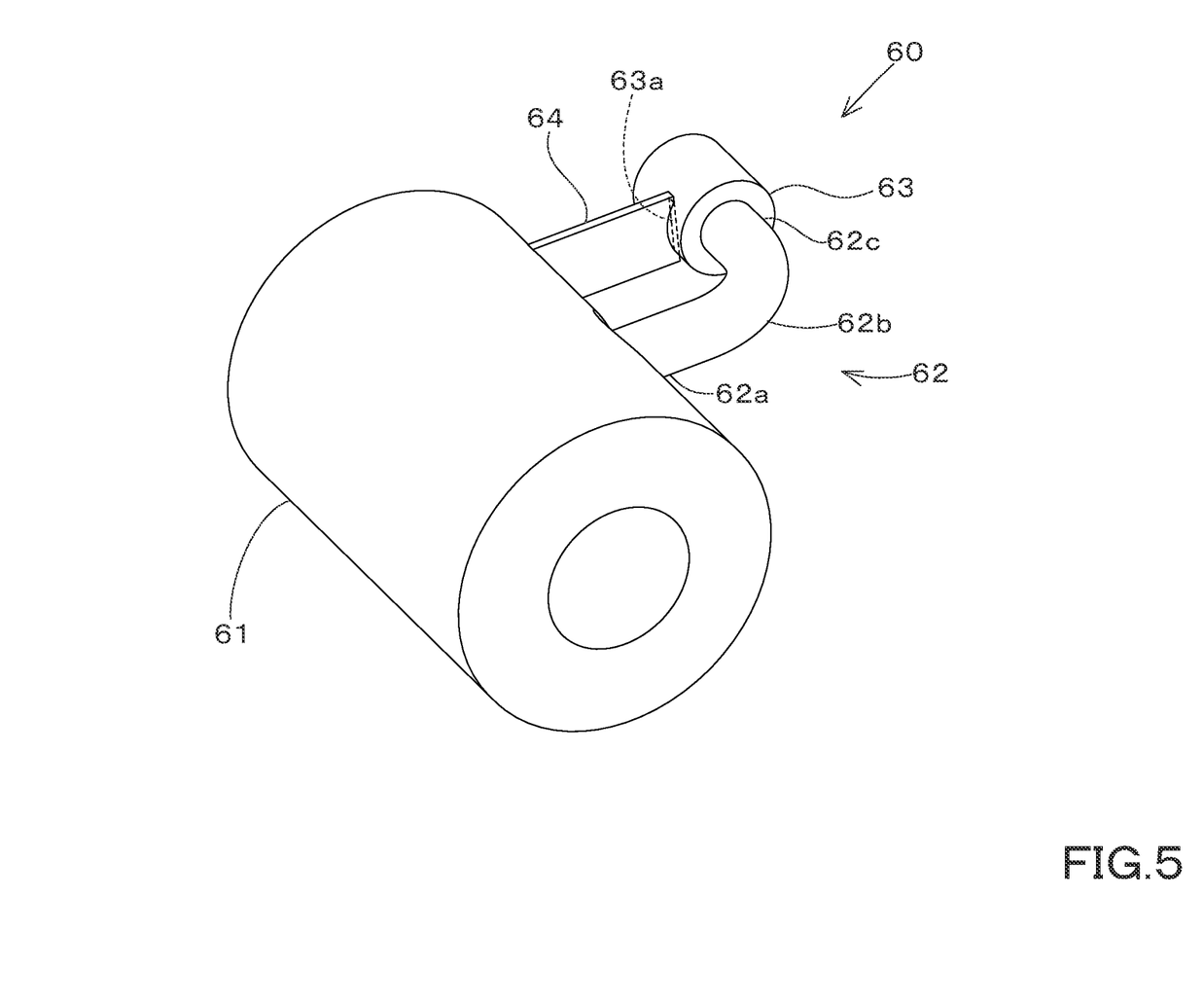
FIG. 5 is a perspective view of the greasing structure seen from the tip end side of the arm according to the embodiment.
Figure 6:
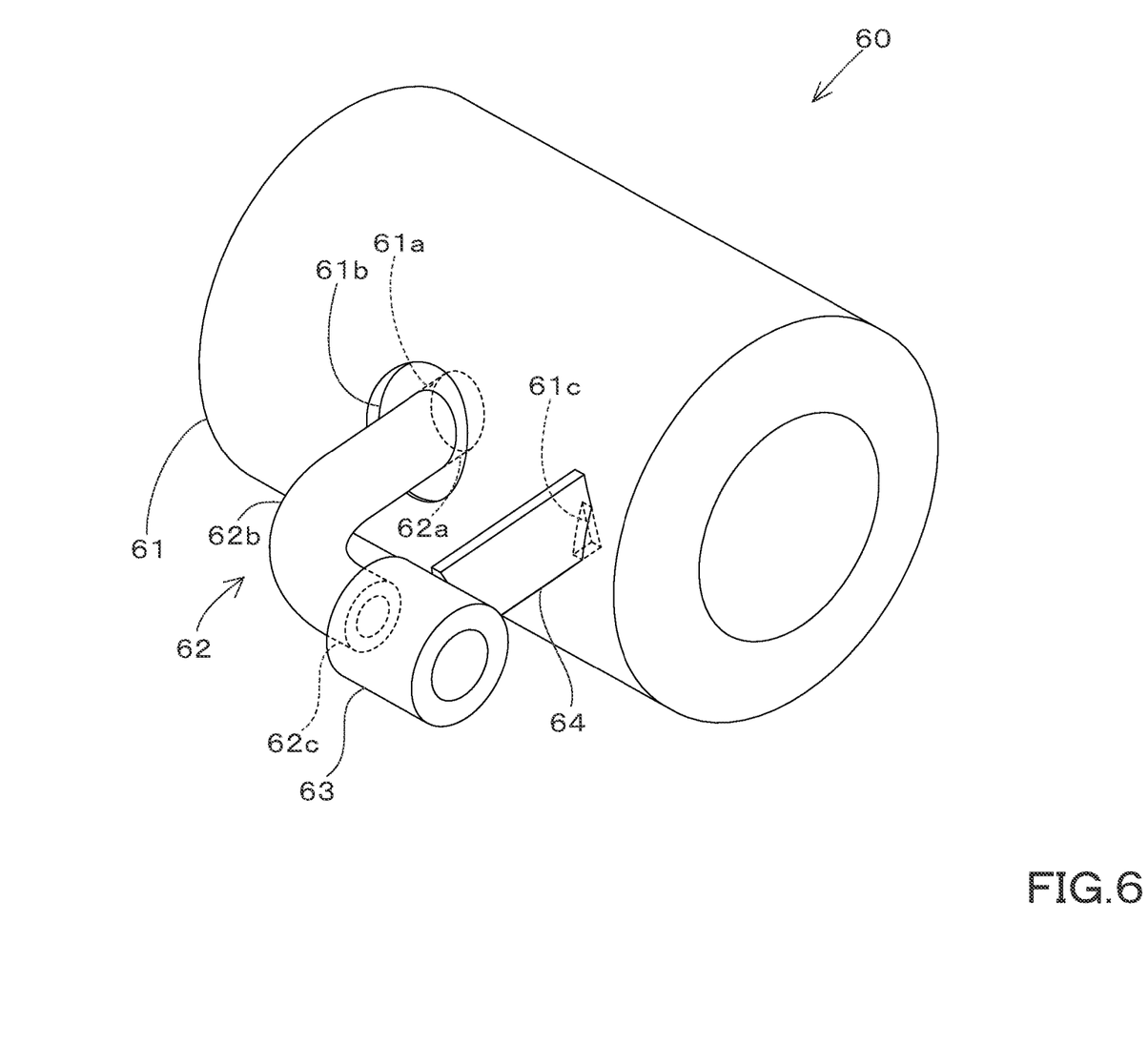
FIG. 6 is a perspective view of the greasing structure seen from a base end side of the arm according to the embodiment.

As shown in FIG. 5 and FIG. 6, the greasing structure includes the first connecting boss 61, the greasing tube 62, the greasing portion 63, and the support member 64.

The first connecting boss 61 is a cylindrical member. A greasing hole 61a is formed on the peripheral surface of the first connecting boss 61. The greasing hole 61a is formed in the middle portion of the first connecting boss 61 in the support shaft direction, and penetrates from the outside of the boss toward the inside of the boss. A recess portion 61b is formed on the outer peripheral surface of the greasing hole 61a provided outside the boss. In addition, a support recess portion 61c is formed on the outer peripheral surface of the first connecting boss 61.

The greasing tube 62 is a tube material having a hollow inside. The greasing tube 62 has one end portion 62a of the greasing tube 62, the other end portion 62c, and a tube body portion 62b connecting the one end portion 62a and the other end portion 62c. The one end portion 62a of the greasing tube 62 is connected to the greasing hole 61a of the first connecting boss 61. In particular, the one end portion 62a of the greasing tube 62 is inserted to the greasing hole 61a of the first connecting boss 61, and the greasing tube 62 and the first connecting boss 61 are welded to each other. The bead formed when the greasing tube 62 and the first connecting boss 61 are bonded and fixed to each other is formed in the recess portion 61b provided outside the boss.

The tube body portion 62b is housed inside the arm body 30. The one end portion 62a side of the tube body portion 62b is connected to the first connecting boss 61 and extends radially outward of the first connecting boss 61 in the longitudinal direction of the arm body 30. The other end portion of the tube body portion 62b is curved at an intermediate portion and extends in the machine width direction K2. In other words, the tube body portion 62b is curved such that the one end portion 62a side is oriented to the radial direction of the first connecting boss 61, and the other end portion 62c side is oriented to the direction substantially parallel to the axial direction of the first connecting boss 61. That is, the greasing portion 63 connected to the other end side of the greasing tube 62 is opened toward the machine width direction K2. In this manner, since the greasing portion 63 is oriented toward the support shaft direction of the first connecting boss 61, it is possible to reduce the possibility that the greasing portion 63 is crushed due to the contact with rocks, earth and sand, and the like during the working of the working machine 1 and the like.

The support member 64 is connected to the outer peripheral surface of the first connecting boss 61 and to the greasing portion 63 connected to the other end portion 62c of the greasing tube 62, and supports the greasing tube 62. In particular, the one end side of the support member 64 is inserted into a support recess portion 63a formed on the outer peripheral surface of the greasing portion 63, and is welded to the support recess portion 63a. In addition, the other end side of the support member 64 is welded to a support recess portion 61c formed on the outer peripheral surface of the first connecting boss 61. In this manner, the first connecting boss 61 and the greasing portion 63 are supported, and thereby the rigidity of the bearing member 60 can be improved. In addition, the other end of the support member 64 may be welded to the outer peripheral surface of the first connecting boss 61. Further, the first connecting boss 61 and the greasing portion 63 can be aligned in advance and fixed to each other before being attached to the arm body 30. Thus, it is not necessary to align the first connecting boss 61 and the greasing portion 63 when the bearing member 60 is attached to the arm body 30, and the bearing member 60 can be easily attached to the arm 16. Additionally in the present embodiment, the greasing tube 62, the first connecting boss 61, the greasing portion 63, and the support member 64 are previously integrated by the welding before being attached to the arm body 30. In this manner, after the assembly of the bearing member 60 is manufactured, the assembly of the bearing member 60 can be attached to the arm body 30. Thus, the number of attachment steps for attaching the bearing member 60 to the arm body 30 can be reduced, and the bearing member 60 can be easily attached to the arm body 30. In addition, when the greasing tube 62 is supported by the support member 64, the greasing tube 62 and the greasing portion 63 can be prevented from being damaged or deformed by contact with other members during transportation or storage of the bearing member 60.

The second sidewall 32 of the arm body 30 is provided with the second attachment portion 34 cutout from the position communicating with the cutout portion 32a along the longitudinal direction of the arm body 30, having a shape corresponding to the greasing portion 62, the greasing portion 63, and the support member 64. In addition, the greasing portion 63 and the support member 64 are fixed to the second attachment portion 34.

More specifically, the second attachment portion 34 includes the first attachment hole 34a and the second attachment hole 34b. The first attachment hole 34a is a hole that has an outer diameter substantially same as the outer diameter of the greasing portion 63 (slightly larger than the outer diameter of the greasing portion 63 so that the greasing portion 63 can be inserted), and the second attachment hole 34b is a hole having a shape corresponding to the support member 64. The width N1 of the second attachment hole 34b (see FIG. 2) is wider than the outer diameter of the tube body portion 62b of the greasing portion 62 and is substantially same as the width of the support member 64 (slightly larger than the width of the support member 64 so that the support member 64 can be inserted).

The greasing portion 63 is inserted to the first attachment hole 34a, and the edge portion of the first attachment hole 34a and the greasing portion 63 are welded to each other. In other words, the other end portion 62c is attached to the side surface of the arm body 30 with the greasing portion 63. In addition, a support member 64 is arranged in the second attachment hole 34b, and the edge portion of the second attachment hole 34 and the support member 64 are welded to each other. In addition, a grooving process is previously applied to a portion of the support member 64 facing the edge portion of the second attachment hole 34, and the outer surface of the second sidewall 32, the outer surface of the support member 64, and the bead portion connecting these two members form substantially the same surface after the welding (or after both the welding and the surface processing). In other words, the side surface of the arm body 30 and the support member 64 form substantially one surface on the surface thereof. Thus, since the change in cross section at the attachment position of the second wall portion 32 and the support member 64 is small, the stress concentration at the portion can be avoided.

As shown in FIG. 2, the length N2 of the upper portion of the second attachment hole 34b in the longitudinal direction is substantially equal to the length N4 of the upper portion of the support member 64, and the length N3 of the lower portion of the second attachment hole 34b is substantially equal to the length N5 of the lower portion of the support member 64.

The greasing portion 63 is a cylindrical member having an outer diameter larger than that of the tube body portion 62b, and protrudes outward from the second sidewall 32. The shape of the greasing portion 63 is not limited to the cylindrical shape, and may be appropriately changed corresponding to the shape of the device used for the greasing operation.

According to the configuration described above, the lubricating fluid (the grease) supplied from the greasing portion 63 is supplied to the inside of the first connecting boss 61 through the inside of the greasing portion 63 and the inside of the tube body portion 62b of the greasing tube 62.

Next, an attaching process for attaching the bearing member 60 to the arm body 30 will be described below. The attaching process of the bearing member 60 includes a first process, a second process, and a third process.

The first step is a step of integrally connecting and fixing the first connecting boss 61, the greasing tube 62, the greasing portion 63, and the support member 64 by the welding to manufacture the assembly of the bearing member 60. In the first step, one end side of the support member 64 is inserted into the support concave portion 63a of the greasing portion 63 and is welded and connected to the support concave portion 63a, and one end side of the greasing tube 62 is inserted into the greasing portion 63 and is weld and connected to the greasing portion 63. In addition, the other end side of the greasing tube 62 is inserted into the greasing hole 61*a*, and the other end side of the support member 64 is aligned with the support recess portion 61*c* of the first connecting boss 61. Then, the other end side of the greasing tube 62 is welded and connected to the greasing hole 61*a*, and the other end side of the support member 64 is welded and connected to the support recess portion 61*c* formed on the outer peripheral surface of the first connecting boss 61.

The second step (a housing step) is a step of housing the greasing tube 62 of the bearing member 60 inside the arm body 30. In particular, in the second step, one end portion 62*a* of the greasing tube 62, the tube body portion 62*b*, and a part of the greasing portion 63 are housed inside the arm body 30 with the second attachment portion 34 provided on the side surface of the arm body 30. As shown in FIG. 3 and FIG. 4,the bearing member 60 is moved such that the first connecting boss 61 passes through the cutout portion 32*a* formed in the second sidewall 32 from the second sidewall 32 side (the right side) of the arm body 30 toward the first sidewall 31 side (the left side) and that the greasing tube 62 passes through the second attachment portion 34, and thus the greasing tube 62 is housed inside the arm. At this time, the one end side (the left side) of the first connecting boss 61 protrudes outside the arm from the cutout portion 31*a* formed in the first sidewall 31, and the other end side (the right side) protrudes outside the arm from the cutout portion 32*a* formed in the second sidewall 32. And, the support shaft direction of the first connecting boss 61 of the bearing member 60 is substantially parallel to the support shaft direction of the second connecting boss 66 formed on the first sidewall 31 and the second sidewall 32 of the arm 16. Then, the one end (the right side) of the greasing portion 63 is aligned so as to protrude from the second sidewall 32 to the outside of the arm.

The third step (a welding step) is a step of fixing the bearing member 60 to the arm body 30. In the third step, the top wall 35 of the arm 16 and the bottom wall 36 of the arm 16 is welded to the outer peripheral surface of the first connecting boss 61 of the bearing member 60, the cutout portion 31 a formed in the first sidewall 31 is welded to the one side (the left side) of the outer peripheral surface of the first connecting boss 61, and the cutout portion 32*a* (the first attachment portion 33) formed in the second sidewall 32 is welded to the other side (the right side) of the outer peripheral surface of the first connecting boss 61. In addition, the support member 64 is welded to the edge portion of the second attachment hole 34*b* (the second attachment portion 34) in the second sidewall 32, and the greasing portion 63 is welded to the cutout portion 32*a* (the second attachment portion 34) formed in the second sidewall 32. In addition, if necessary, the bead of the welded portion between the support member 64 and the second sidewall 32 is shaved to form substantially one surface spreading over the support member 64, the second sidewall 32, and the bead portion. In other words, the side surface of the arm body 30 and the support member 64 form substantially one surface with the surfaces thereof.

The greasing structure described above may be applied not only to the first connecting boss 61 provided at the tip end of the arm 16 but also to other bearings that require the greasing such as the boss provided at the connecting portion between the boom 15 and the arm 15 and the connecting portion between the boom 15 and the swing bracket 14.

As described above, the arm 16 for the working machinel according to the embodiment, includes: the arm body 30 having a tubular shape; and the bearing member 60 attached to the tip portion of the arm body 30 and pivotally supporting another member (the working tool 17). The bearing member 60 includes: the boss (the first connecting boss 61) having a cylindrical shape; and the greasing tube 63 having: the one end portion 62*a* attached to the greasing hole 61*a* provided on the outer peripheral surface of the boss; the other end portion 62*c* attached to the side surface (the second wall portion 32) of the arm body 30; and the tube body portion 62*b* connecting the one end portion 62*a* and the other end portion 62*c*. The tube body portion 62*b* is curved orienting the one end portion 62*a* in a radial direction of the boss and orienting the other end portion 62*c* in a direction substantially parallel to an axial direction of the boss. The side surface of the arm body 30 is provided with the cutout portion (the second attachment portion 34) to which the tube body portion 62*b* is inserted, the cutout portion opening toward the tip end portion. The one end portion 62*a* of the greasing tube 63 and the tube body portion 62*b* are housed inside the arm body 30. The other end portion 62*c* of the greasing tube 63 is oriented to an outside of the arm 16 through the cutout portion 34 and fixed to the side surface of the arm 16.

According to the configuration described above, the bearing member 60 includes the greasing tube 63 having: the one end portion 62*a* attached to the greasing hole 61*a* provided on the outer peripheral surface of the boss (the first connecting boss 61) of the bearing member 60; the other end portion 62*c* attached to the side surface of the arm body 30; and the tube body portion 62*b* connecting the one end portion 62*a* and the other end portion 62*c*. The side surface (the second side wall 32) of the arm body 30 is provided with the cutout portion (the second attachment portion 34) to which the tube body portion 62*b* is inserted, the cutout portion opening toward the tip end portion. Thus, in the manufacturing process, the tube main body portion 62*b* of the greasing tube 62 is housed inside the arm body 30 through the cutout portion (the second attachment portion 34) provided on the side surface (the second wall portion 32) of the arm body 30, and the tube body portion 62*b* can be aligned while being visually recognized from the outside of the arm body 30. The configuration can simplify the manufacturing process of the arm 16 for the working machine 1 having the greasing portion 63 for greasing the bearing member 60 provided at the arm tip, the greasing portion 63 being provided on the arm side surface.

In addition, the bearing member 60 has the support member 64 connected to the outer peripheral surface of the first connecting boss 61 and to the other end portion 62*c* of the greasing tube 62, the support member 64 supporting the greasing tube 62. The cutout portion 32*a* has a shape corresponding to the support member 64 and to the other end portion 62*c* of the greasing tube 62. The support member 64 and the other end portion 62*c* of the greasing tube 62 are arranged in the cutout portion 32*a* and welded to the side surface of the arm body 30.

According to the configuration mentioned above, the support member 64 supports the first connecting boss 61 and the greasing tube 62, and thereby the rigidity of the bearing member 60 can be improved. In addition, the support member 64 is capable of easily align the greasing portion 63 with respect to the first connecting boss 61. In addition, the support member 64 is capable of easily align the greasing portion 63 with respect to the arm body 30.

In addition, the arm includes the greasing portion 63 provided in the other end portion 62*c* of the greasing tube 62, the greasing portion 63 having a cylindrical shape that has an outer diameter larger than the tube body portion 62*b*. The support member 64 is connected to the greasing portion 63 and to the outer peripheral surface of the first connecting boss 61. The greasing portion 63 and the support member 64 are arranged in the cutout portion 32a and welded to the side surface of the arm body 30.

According to the configuration described above, the lubricant (the grease) can be easily fed from the greasing portion 63. In addition, the support member 64 can be easily connected with use of the greasing portion 63.

In addition, the side surface of the arm body 30 forms substantially one surface with a surface of the support member 64. In this manner, the change in cross section at the attachment position of the support member 64 is reduced. Thus, the stress concentration at the attachment position of the support member 64 of the arm body 30 can be avoided.

In addition, the arm body 30 has a square tube shape formed of: the first sidewall 31; the second sidewall 32 arranged opposed to the first sidewall 31; the top wall 35 connecting the upper portion of the first sidewall 31 and the upper portion of the second sidewall 32; and the bottom wall 36 connecting the lower portion of the first sidewall 31 and the lower portion of the second sidewall 32. In this manner, at least the cross section of the arm 16 in the machine width direction forms a rectangular shape or a square shape. Thus, the rigidity of the first member 30 can be improved against the force in the bending direction.

In addition, the bearing member 60 is the bearing member 60 to be attached to a tip end portion of the arm body 30 of the working machine 1, includes: the first connecting boss 61 having a cylindrical shape; the greasing tube 62 having: the one end portion 62a attached to the greasing hole 61a provided on an outer peripheral surface of the first connecting boss 61; and the other end portion 62c oriented in a direction substantially parallel to an axial direction of the first connecting boss 61; and the support member 64 connected to the outer peripheral surface of the first connecting boss 61 and to the other end portion 62c of the greasing tube 62, the support member 64 supporting the greasing tube 62.

According to the configuration described above, in the manufacturing process of the arm 16, the greasing tube 62 can be inserted into the inside of the arm through the cutout portion (the second attachment portion 34) of the arm body 30. In this manner, the configuration can simplify the manufacturing process of the arm 16 for the working machine 1 having the greasing portion 63 for greasing the bearing member 60 provided at the arm tip, the greasing portion 63 being provided on the arm side surface. In addition, since the greasing tube 62 is supported by the support member 64, it is possible to prevent the greasing tube 62 from being damaged or deformed during the storing or the transporting of the bearing member 60.

In addition, the manufacturing method of the arm 16 includes: the housing step of housing the tube body portion 62b and the one end portion 62a of the greasing tube 62 inside the arm body 30 through the cutout portion 32a provided on the side surface of the arm body 30; and the welding step of welding the other end portion 62c of the greasing tube 62 to the side surface of the arm 16 after the housing step.

According to the method described above, the greasing tube 62 is housed inside the arm body 30 through the cutout portion (the second attachment portion 34) provided on the side surface (the second wall portion 32) of the arm body 30, the greasing tube 62 can be aligned while being visually recognized from the outside of the main body 30. In this manner, the configuration can simplify the manufacturing process of the arm 16 for the working machine 1 having the greasing portion 63 for greasing the bearing member 60 at the arm tip, the greasing portion 63 being provided on the arm side surface.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. An arm for a working machine, comprising:
   an arm body having a tubular shape; and
   a bearing member attached to a tip portion of the arm body and pivotally supporting another member,
   wherein the bearing member includes:
      a boss having a cylindrical shape; and
      a greasing tube having:
         one end portion attached to a greasing hole provided on an outer peripheral surface of the boss;
         the other end portion attached to a side surface of the arm body; and
         a tube body portion connecting the one end portion and the other end portion,
   wherein the tube body portion is curved orienting the one end portion in a radial direction of the boss and orienting the other end portion in a direction substantially parallel to an axial direction of the boss,
   wherein the side surface of the arm body is provided with a cutout portion to which the tube body portion is inserted, the cutout portion opening toward the tip end portion,
   wherein the one end portion of the greasing tube and the tube body portion are housed inside the arm body,
   and wherein the other end portion of the greasing tube is oriented to an outside of the arm through the cutout portion and fixed to the side surface of the arm.

2. The arm for the working machine according to claim 1, wherein the bearing member has
   a support member connected to the outer peripheral surface of the boss and to the other end portion of the greasing tube, the support member supporting the greasing tube,
   wherein the cutout portion has a shape corresponding to the support member and to the other end portion of the greasing tube,
   and wherein the support member and the other end portion of the greasing tube are arranged in the cutout portion and welded to the side surface of the arm body.

3. The arm for the working machine according to claim 2, comprising
   a greasing portion provided in the other end portion of the greasing tube, the greasing portion having a cylindrical shape that has an outer diameter larger than the tube body portion,
   wherein the support member is connected to the greasing portion and to the outer peripheral surface of the boss,
   and wherein the greasing portion and the support member are arranged in the cutout portion and welded to the side surface of the arm body.

4. The arm for the working machine according to claim 2, wherein the side surface of the arm body forms substantially one surface with a surface of the support member.

5. The arm for the working machine according to claim 1, wherein the arm body has a square tube shape formed of:
   a first sidewall;

a second sidewall arranged opposed to the first sidewall;

a top wall connecting an upper portion of the first sidewall and an upper portion of the second sidewall; and a bottom wall connecting a lower portion of the first sidewall and a lower portion of the second sidewall.

6. A manufacturing method of the arm for the working machine according to claim 1, comprising:

housing the tube body portion and the one end portion of the greasing tube inside the arm body through the cutout portion provided on the side surface of the arm body; and welding the other end portion of the greasing tube to the side surface of the arm.

7. A bearing member to be attached to a tip end portion of an arm body of a working machine, comprising:

a boss having a cylindrical shape;

a greasing tube having:
one end portion attached to a greasing hole provided on an outer peripheral surface of the boss; and
the other end portion oriented in a direction substantially parallel to an axial direction of the boss; and a support member connected to the outer peripheral surface of the boss and to the other end portion of the greasing tube, the support member supporting the greasing tube.

* * * * *